(12) United States Patent
Hohne

(10) Patent No.: US 6,230,499 B1
(45) Date of Patent: May 15, 2001

(54) DETECTOR DEVICE

(75) Inventor: Jens Hohne, Munich (DE)

(73) Assignee: CSP Cryogenic Spectrometers GmbH, Ismaning (DE)

(*) Notice: Subject to any disclaimer, the term of this patent is extended or adjusted under 35 U.S.C. 154(b) by 0 days.

(21) Appl. No.: 09/469,473

(22) Filed: Dec. 22, 1999

(30) Foreign Application Priority Data

Dec. 23, 1998 (DE) .......................................... 298 23 004 U

(51) Int. Cl.[7] ................................. F25B 9/00; F25B 7/00
(52) U.S. Cl. ...................................................... 62/6; 62/335
(58) Field of Search ............................ 62/6, 335, 259.2, 62/51.1

(56) References Cited

U.S. PATENT DOCUMENTS

| | | | |
|---|---|---|---|
| 5,335,505 | 8/1994 | Ohtani et al. | 62/6 |
| 5,551,244 | * 9/1996 | Bailey | 62/51.2 |
| 5,641,961 | 6/1997 | Irwin et al. | 250/336.2 |
| 5,647,218 | * 7/1997 | Kuriyama et al. | 62/6 |
| 5,711,156 | * 1/1998 | Matsui et al. | 62/6 |
| 5,845,498 | * 12/1998 | Matsui et al. | 62/6 |
| 5,934,077 | * 8/1999 | Martinis | 62/3.1 |
| 5,974,807 | * 11/1999 | Gao et al. | 62/6 |

OTHER PUBLICATIONS

Info–Phys–Tech; "Pulse Tube Cooler—New Refrigerating Machines for Superconducting Engineering and Cryoelectronics", No. 6, Feb. 1996; 4 Sheets.

Wang et al.; "A Two–Stage Pulse Tube Cooler Operating Below 4 K"; Elsevier Science Limited; vol. 37, No. 3; 1997; pp. 159–164.

* cited by examiner

Primary Examiner—William Doerrler
(74) Attorney, Agent, or Firm—Foley & Lardner

(57) ABSTRACT

Disclosed is a detector device with a cooling system having first cooling means (20,30) for providing a first cooling temperature, said first cooling means comprising a two-stage pulse tube cooler system, in which a first pulse tube cooler (20) pre-cools a second pulse tube cooler (30), and second cooling means (82,83,85,86,87) for providing a second cooling temperature, which is lower than the first cooling temperature, said second cooling means being pre-cooled by said first cooling means. Furthermore, the detector device comprises detector means (60) for detecting particles, radiation or fields with a sensor based on a low temperature effect, said detector means being thermally coupled to said second cooling means. Thus, a detector device is provided with a comparably simply structured cooling system whereby sensors can be operated which have a good energy resolution and which can be quasi anywhere on account of the low complexity of the cooling system. (FIG. 1)

20 Claims, 6 Drawing Sheets

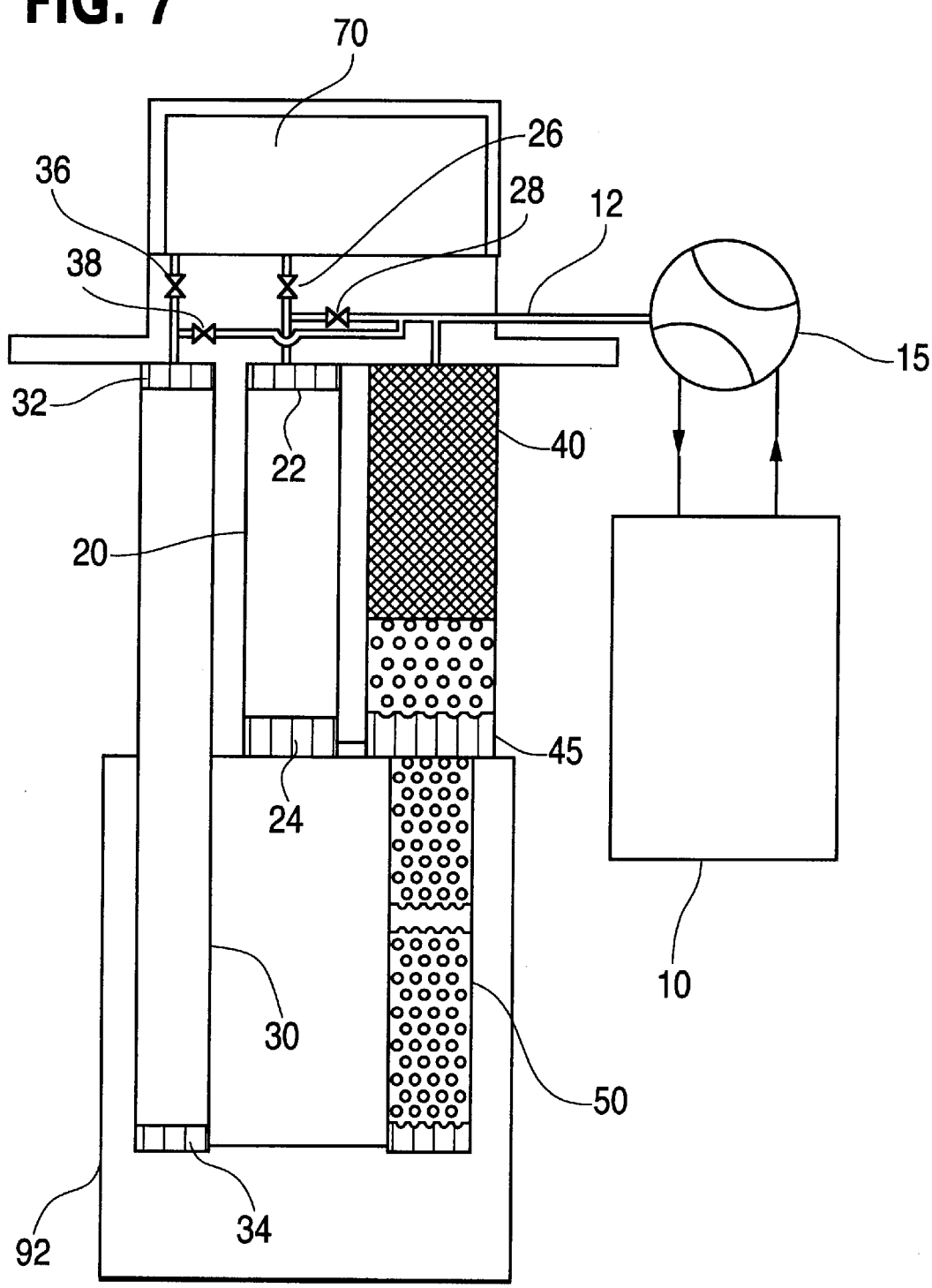

DETECTOR DEVICE

TECHNICAL FIELD

The invention refers to a detector device in accordance with claim 1.

Such detector devices comprising a sensor based on a low temperature effect which is cooled, in a first cooling stage, by way of a pulse tube cooler, have a wide field of operation in analytical applications in which particles, radiation or fields with a high energy resolution and/or a high time resolution are to be examined in any place.

PRIOR ART

For cooling sensors based on a low temperature effect (cryosensors or cryodetectors) cryostats are used in the prior art which comprise a first cooling means and a second cooling means pre-cooled by the first cooling means, the sensor being thermally coupled or interconnected to the second cooling means. For generating a temperature of approximately 4K the first cooling device usually consists of a coupled nitrogen/helium cooler. This cooler is very costly as to the process and the device and requires a lot of space. Furthermore, the required liquid coolant (nitrogen, helium), one the one hand, is expensive and, on the other hand, is not everywhere available. For this reason, the use of sensors which are based on a low temperature effect, is comparatively unprofitable for industrial purposes and therefore unsuitable.

From Info-Phys-Tech No. 6, 1996, from the VDI Technologiezentrum, Physikalische Technologien, a refrigerator in the shape of a pulse tube cooler is known, the pulse tube cooler comprising: a pulse tube at one end at which a cold heat exchanger is provided at which heat is absorbed from outside, and at the other end of which a hot heat exchanger is provided at which heat is released to the outside, a regenerator which serves as an interim heat reservoir, and a pressure oscillator which serves to generate periodical pressure changes, the pulse tube, at the end of which the cold heat exchanger is provided, being connected to the pressure oscillator by way of respective lines via the regenerator so that a periodic shift of a working gas between the pulse tube and the pressure oscillator is made possible.

SUMMARY OF THE INVENTION

It is an object of the present invention to provide a detector device having a sensor based on a low temperature effect which can be cooled or pre-cooled with a minimum extent of work as to device and process.

This object is solved by a detector device in accordance with the features of claim 1.

The detector device according to the present invention comprises a cooling system having first cooling means for providing a first cooling temperature $T_K$, said first cooling means comprising a two-stage pulse tube cooler system, in which a first pulse tube cooler pre-cools a second pulse tube cooler; and second cooling means for providing a second cooling temperature $T_T$, which is lower than the first cooling temperature $T_K$, said second cooling means being pre-cooled by said first cooling means. Furthermore, the detector device comprises detector means for detecting particles, radiation or fields with a sensor based on a low temperature effect, said detector means being thermally coupled to said second cooling means.

By this arrangement a detector device is provided which has a good energy resolution and which, on account of its being of low complexity, virtually can be employed almost everywhere, thus being mobile. Furthermore, the operation or maintenance of the first cooling stage is cost-effective, as the pulse tube cooler merely requires to be supplied with electric power. As a consequence, the staff can be reduced, as no person must be provided for supervising or refilling the coolants.

According to an advantageous aspect, the first cooling means comprises three or more pulse tube coolers. These are preferably located such that they reach, in several successive cooling stages, the first cooling temperature $T_K$ to which an object to be cooled, i.e. in this case the second cooling means, should be cooled. In particular the term "successive cooling stages" is to be understood such that pulse tube coolers for providing a higher cooling temperature for which they are optimized pre-cool pulse tube coolers for providing a lower cooling temperature for which those are optimized. Principally, the object to be cooled or a plurality of objects to be cooled can be positioned at any cold head (cold heat exchanger) of the respective cooling stages. However, it is advantageous to position the object to be cooled at the cooling stage which provides the lowest temperature, i.e. in a two-stage pulse tube cooler system as described above at the second pulse tube cooler.

According to another advantageous aspect, each of the pulse tube coolers comprises a pulse tube at one end of which a cold heat exchanger is provided at which heat is absorbed from outside, and at the other end of which a hot heat exchanger is provided at which heat is released outwardly. Moreover, the pulse tube cooler has a regenerator serving as an interim heat reservoir, and a pressure oscillator which serves to generate periodical pressure changes. In this case the pulse tube, at the end of which the cold heat exchanger is provided, is connected with the pressure oscillator by way of respective lines via the regenerator so that a periodic shift of a working gas between the pulse tube and the pressure oscillator is made possible. In contrast to other mechanical coolers the pulse tube cooler has the advantageous feature that there is not much vibration.

According to another advantageous aspect the pulse tube, at that end at which the hot heat exchanger is provided, comprises a flow resistance and a container or tank to receive a ballast volume.

According to another advantageous aspect, each of the pulse tube coolers further comprises a secondary line extending from the respective end of the pulse tube at which the hot heat exchanger is provided, to the line provided between the pressure oscillator and the regenerator, and running into this line, the secondary line comprising a variable or variably adjustable flow resistance.

The second cooling means preferably is positioned at or in the vicinity of the cold heat exchanger of a respective pulse tube cooler.

Moreover, the detector device may comprise an absorber which is thermally coupled to a sensor and in which incident particles and radiation interact. The absorber may consist of a dielectric or a semi-conductor or a metal or a semi-metal or a semi-metal alloy or a super conductor or a combination of the individual materials.

As second cooling means a demagnetization stage is preferably used. Furthermore, a $^3$He/$^4$He-dilution refrigerator or a $^3$He-cooler or mechanic cooling means such as a helium compressor cooler, or electric cooling means such as a Peltier element, or a superconducting tunnel diode such as an NIS-diode can be employed.

According to another advantageous aspect of the detector device in accordance with the invention the cooling system is part of a cryostat into which the detector means is incorporated, the cryostat further comprising an entrance port or inlet port for passing the particles and the radiation to be examined from the outer part of the cryostat into the inner part of the cryostat to the detector means. Furthermore, the cryostat may comprise a focussing device such as an X-ray lens or a Wolter arrangement or a Fresnel lens or a focussing tube bundle or electric focussing devices/defocussing devices or magnetic focussing devices/defocussing devices.

The sensors used in the detector device which are based on a low temperature effect, or also cryo-detectors or cryogenic detectors are sensors which measure energy deposited by an absorption of radiation or particles by way of an effect which only or in particular occurs at low temperatures (operational temperature range lower than 20 K, however, preferably lower than <4 K). These temperatures are provided by a heat sink thermally coupled to the detector means which comprises a sensor based on a low temperature effect.

These effects can be:

i) Increase of temperature after deposition of energy (calorimeter) in an absorber (dielectric, metal, superconductor, etc. ). This increase of temperature is the higher the lower the starting temperature is, as the heat capacities decrease with low temperatures. The higher the increase of temperature is, the more accurate the energy deposited can be derived therefrom.

ii) Generation of phonons (lattice vibrations in an absorber material) by energy deposition. In order that these lattice vibrations "appear" as strongly as possible, i.e. make an accurate determination of the energy (and possibly of the location of the energy deposition in the absorber) possible, there should be as little lattice vibrations as possible in the initial state. The lower the initial temperature, the less lattice vibrations there are.

iii) Generation of quasi particles (breaking up of Cooper pairs) in a superconductor. Superconduction is a low temperature effect. The lower the transitional temperature to the superconduction, the more of these quasi particles are generated by deposition of energy. The more quasi particles are generated, the more accurately the energy can be determined.

iv) Change of the spin orientation or the magnetization in a spin system cooled down to low temperatures consisting of paramagnetic ions on account of an energy deposition.

For measuring the increase of temperature, the lattice vibrations, the quasi particles (in general the excitations) or the change in the magnetization, there are various possibilities and it generally holds true that the excitations are generated in an absorber and are detected in a sensor. The sensor and the absorber can be identical. Sensors which come into question are:

a) Superconducting phase transition thermometers, for example, as a sensor in a microcalorimeter: These essentially consist of an absorber, a thermometer (superconducting layer, e.g. from tungsten, iridium, aluminum or tantalum) and cooling means or a coupling to a heat sink. In the temperature transition range between its superconducting and normal-conducting phase the thermometer changes its electrical resistance very much in dependency of the temperature, i.e. also after absorption of lattice vibrations and quasi particles.

b) Superconducting tunnel diodes: they consist of two overlapping thin superconducting films (SIS: superconductor-insulator-superconductor, the films not necessarily needing to consist of the same superconductor on both sides) or a superconducting and a normal-conducting film (NIS: normal conducting-insulator-superconductor), the respective films being separated by a thin electrically insulating barrier. The barrier is so thin that it allows quantum-mechanical tunneling of electrons or quasi particles from one electrode to the other. If the NIS-diode or the SIS-diode is operated below the transition temperature of the respective superconductors and if the applied voltage is smaller than the voltage (NIS) corresponding to the superconducting energy gap, or smaller than twice this voltage (SIS), the current flowing over the barrier increases if energy is deposited in the tunnel diode. The deposition of the energy may occur by increasing the temperature, by absorption of lattice vibrations or quasi particles, or directly by absorbing radiation or particles.

c) Thermistor, such as an NTD-thermometer (NTD: "Neutron Transmutation Doping", i.e. semiconductor heavily doped with neutrons). These thermometers can be used for measuring temperature variations, since in these thermometers, as in all semiconductors, the resistance increases with decreasing temperature. So as to avoid that the resistances, at very low temperatures, increase to such a degree that they can no longer be measured with sufficient accuracy, the semiconductors used are heavily doped thereby decreasing their resistance.

d) Magnetic bolometers. These sensors which have a weak thermal coupling to a heat sink with a temperature preferably in the area of milli Kelvin include a weak concentration of paramagnetic ions in a magnetic field. As such ions preferably ions of rare grounds, e.g. erbium ($Er^{3+}$), are used. If a small amount of energy, for example by electromagnetic radiation, is deposited in such a sensor, the increase of temperature causes a change in the magnetization of the paramagnet formed by the paramagnetic ions which change can be measured for example by using a coil which is connected at one input of a SQUID. Preferably, an absorber is thermally coupled to the magnetic bolometer.

The use of such cryogenic sensors offers several advantages. On the one hand, a good energy resolution must be mentioned which is at 6 keV X-radiation in the range of approximately 5 eV, and at 1.5 keV X-radiation in the range of approximately 3 eV. In addition to the good energy resolution of cryogenic sensors also their detection efficiency even at low energies (lower than 2 keV) is of an advantage. Virtually every photon incident on the sensor can be detected. Moreover, a pre-determined energy range of particles or radiation to be analyzed can be simultaneously detected and the pulses generated by the particles or radiation in the detector can be read out rapidly whereby even time-dependent phenomena with a short time constant can be observed.

In order to improve the readout speed or for adjusting an optimum operational temperature of the detector means or the sensor a heating device preferably is provided which is thermally coupled to the detector means. If the temperature or the temperature range of the cooling system or the second cooling means is below the optimum temperature for the respective cryogenic sensor, or if the provided cooling temperature fluctuates, an optimum operational temperature can be adjusted by regulating the energy supplied to the sensor by the heating means. Furthermore, the adjustment of a temperature above the temperature provided by the cooling means offers the possibility of "active cooling". By this, the reduction of the heating performance (from the heating means) in the case of an energy deposition of an incident particle or incident radiation taking place in the sensor means. By quickly resetting the sensor means to the predetermined optimum operational temperature a signal acceleration can thus be achieved and hence an improvement of the readout speed.

To detect magnetic fields or their changes also SQUIDS ("Super-conducting Quantum Interference Devices") can be used as sensors.

Furthermore, the detector means may comprise a plurality of sensors. This is, for example, advantageous if two different sensors are used the energy resolution of which has a different quality in different energy ranges.

It should be apparent that all aspects referring to the cooling system (pulse tube coolers) can be combined with all aspects referring to the detector means.

Further details, features and advantages of the invention will become more apparent from the subsequent description of the preferred embodiments in conjunction with the accompanying drawing.

In the accompanying drawings:

FIG. 7 shows a schematic view of a two-stage pulse tube cooler system with the most important parts.

In the following the detector device will be described in accordance with the present invention.

Cryostat

Figure 1:
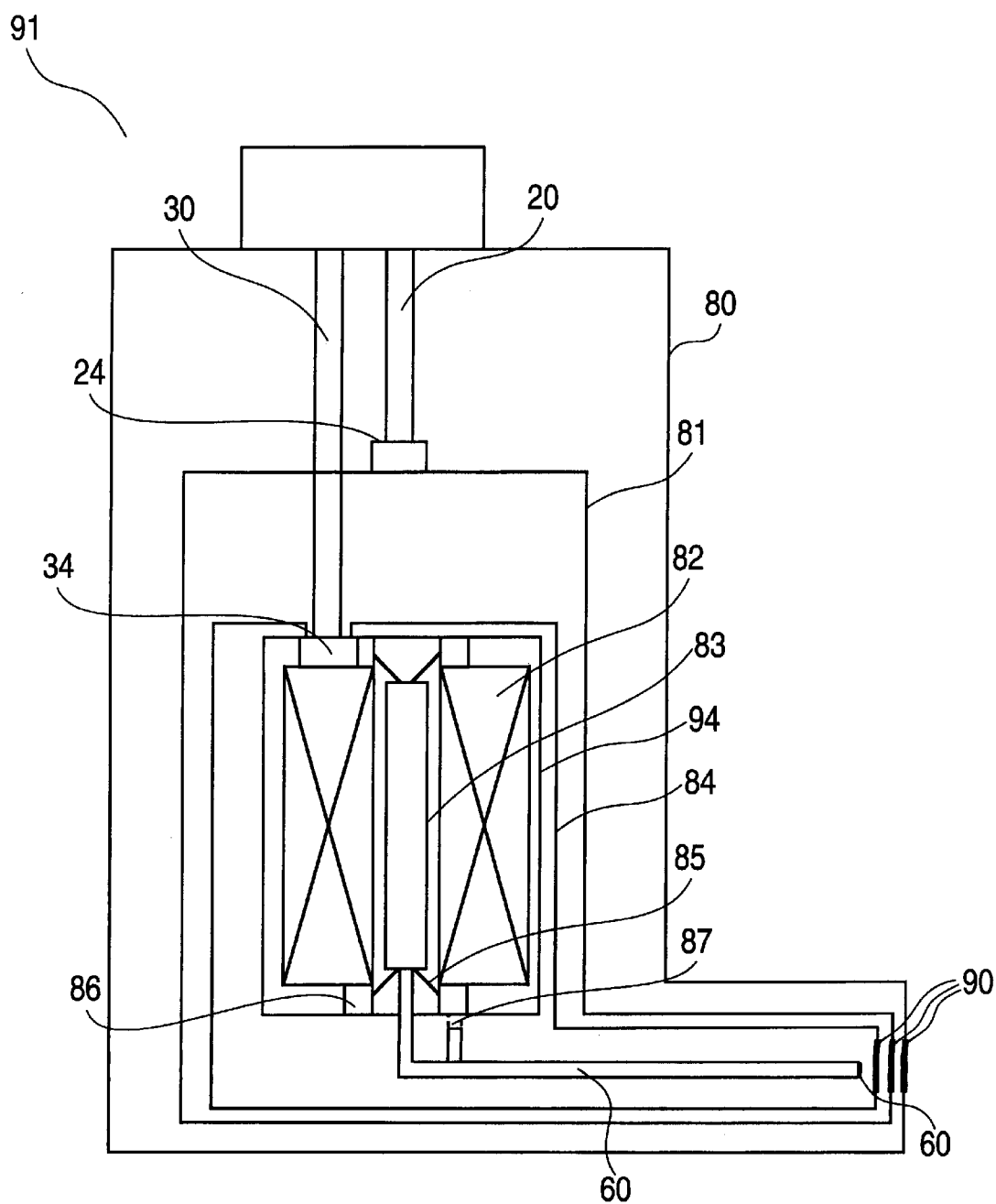
FIG. 1 shows a schematic view of a detector device in accordance with the invention in which the detector means is incorporated in a cryostat.

First of all, reference is made to FIG. 1 which shows a schematic view of a detector device in accordance with the invention in which the detector means is incorporated in a cryostat.

Regarded from the inside to the outside, the detector means 60 for detecting particles, radiation or fields, such as for example a microcalorimeter, is thermally coupled via a so-called cooling finger 95 to a salt pill 106 of second cooling means in this case in the form of an (adiabatic) demagnetizing stage 82, 83, 85, 86, 87, representing a heat sink with a temperature of approximately 30 to 300 mK. The second cooling means moreover comprises a magnet 82, which magnetizes the salt in the salt pill 83. For thermal decoupling the salt pill 83 is for example hung up via Kevlar threads 85, the threads 85 being strained via a clamping device 86, for example in the form of feathers or materials which contract in the case of a decrease in temperature. By way of a thermal switch 87 the salt pill 83 can be thermally coupled with the magnet 82 or with the clamping device 86 during the operation of the demagnetizing stage. The demagnetizing stage is surrounded by a magnetic shield 94. The magnetic shield 94 serves to shield the magnet 82 vis-a-vis the surroundings. In the operating mode of the detector means the magnet 82 or its field is slowly reduced so that the temperature in the salt pill 83 is kept constantly at or below the operational temperature of the detector means 60 or the sensors thereof. The magnetic field still remaining must be compensated and shielded. To this end, the coil of the magnet 82 may already comprise compensation coils. The magnetic shield 94 may consist of a superconductor (e.g. niobium, tantalum) or of a material with high magnetization (e.g. cryoperm or vacrylux or a combination of both). At the lower end, the magnetic shield 94 surrounding the demagnetizing stage, has a small hole through which the cooling finger 95 extends which holds the detector device 60. Furthermore, the demagnetizing stage and the detector means 60 are surrounded by a shield 84, within which a temperature TK of approximately 4 K is set. This temperature TK is set by a pulse tube 30 representing the second stage of a pulse tube cooling system used as first cooling means. In so doing, a cold head 34 or a cold heat exchanger 34 or a "4K-plate" 34 is connected with a magnet 82. The 4K-shield 84 is surrounded by a shield 81, within which a temperature of approximately 67 K is set. This temperature is set by a pulse tube 20 representing the first stage of a pulse tube cooling system used as first cooling means. In so doing, a cold head 24 or a cold heat exchanger 24 or a "67K-plates" 24 is connected with a 67K-shield 81. The remaining parts of the respective pulse tube coolers in addition to the pulse tubes 20, 30, such as the regenerator or the pressure oscillator, are not presented in FIG. 1 for the sake of simplicity. The outer sheath of the cryostat 91 is formed by a vacuum pot 80 which surrounds the respective cooling means and the detector means 60 with a sensor and absorber (not shown). In order that radiation may reach from the outer part to the inner part of the cryostat 91 and thus hit the detector means 60, inlet ports or entry windows 90 are provided.

Pulse tube cooler

Figure 2:
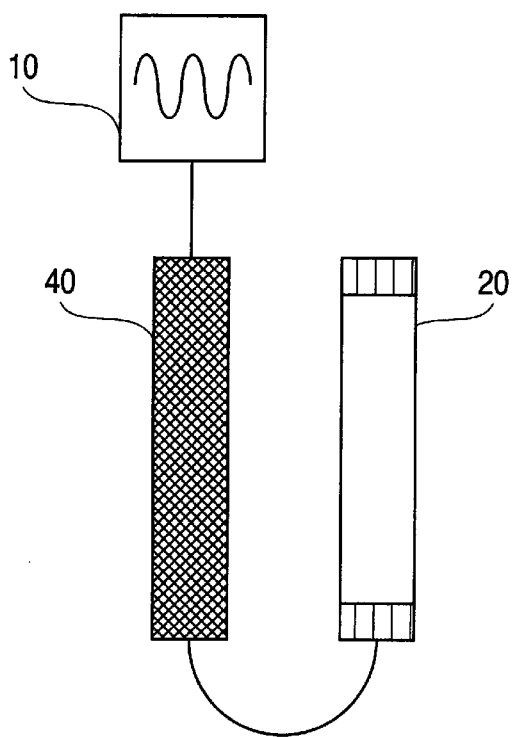
FIG. 2 shows a schematic view of a pulse tube cooler according to a first aspect.
Figure 5:
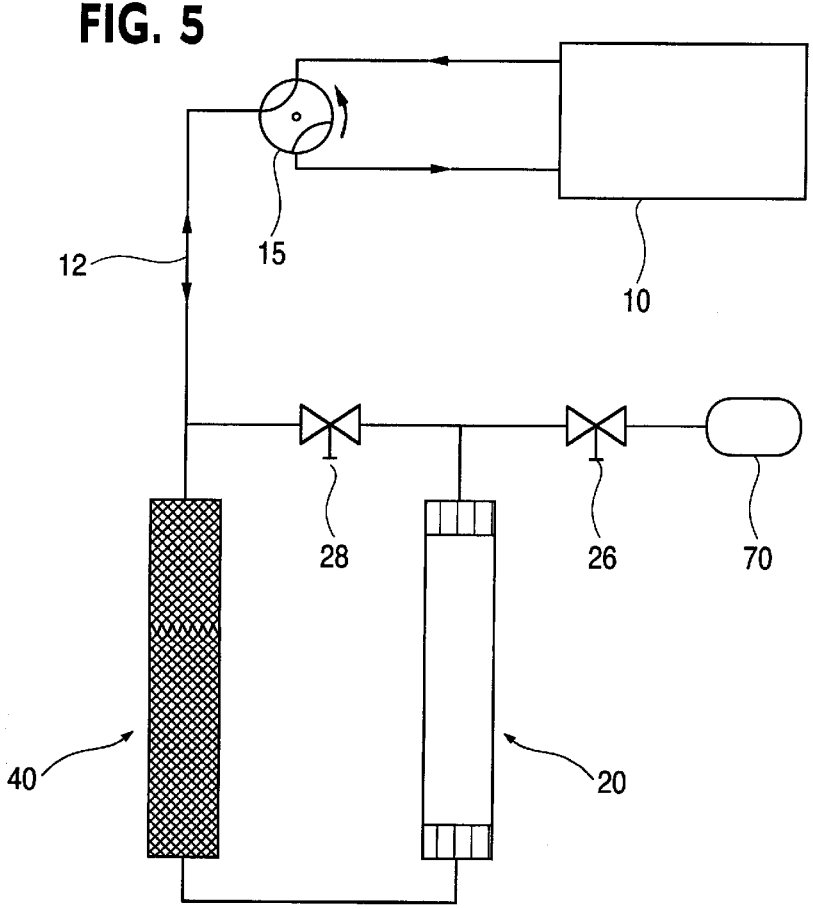
FIG. 5 shows a schematic view of a pulse tube cooler according to the third aspect in a more detailed illustration than in FIG. 4.

In the following the structure and the mode of operation of a pulse tube cooler will be described. FIG. 2 shows a schematic view of a pulse tube cooler in accordance with the first aspect. Here, as in the following figures, the same parts are referenced by the same reference signs. The cooling effect of the pulse tube cooler is based on the periodic pressure change and shift ("pulsing") of a working gas in a thin-walled cylinder with heat exchangers at both ends, the so-called pulse tube 20. The pulse tube 20 is connected with the pressure oscillator 10, 15 via a regenerator 40. The regenerator 40 serves as an interim heat storage reservoir which cools down in-flowing gas from the pressure oscillator 10, 15 before entering the pulse tube 20 and subsequently heats up the out-flowing gas again to room temperature. For this purpose it is preferably filled with a material of high heat capacity which has a good heat exchange with the flowing gas and at the same time has a low flow resistance. At temperatures above 30 K batches of fine-meshed stainless steel filters or bronze filters are used as regenerator filling. For lower temperatures, for reasons of high thermal capacity—lead-shot and recently also magnetic materials, e.g. Er-Ni-alloys are employed. For generating the pressure oscillation a compressor 10, as shown in FIG. 5, in combination with a rotary valve 15, connected on load side, is used which periodically connects the high pressure side and the low pressure side of the compressor with the cooler. As an alternative thereto, the pressure oscillation can be generated directly via the piston movement of a compressor without valve.

In the first aspect of the pulse tube cooler the pulse tube is closed at the hot end 22. As to quality, the cooling process proceeds as follows: In the compression phase the gas pre-cooled in the regenerator flows into the pulse tube 20. By increasing the pressure the gas is heated in the pulse tube 20 and at the same time is shifted to the hot heat exchanger 22, where part of the compressor heat is dissipated to the environment. Due to the subsequent expansion the gas is cooled down in the pulse tube 20. The gas leaving the pulse tube 20 is colder as that entering the pulse tube and therefore can absorb heat from the cold heat exchanger 24 and the object to be cooled, for example a second or a further cooling means. A more accurate analysis of the process of this aspect shows that a heat exchange between the gas and the tube wall is required ("surface heat pumps") for the heat transport from the cold end 24 to the warm end 22. As the heat contact, however, is effected only in a thin gas layer at the tube wall, this cooling process has not been optimized so far.

Figure 3:
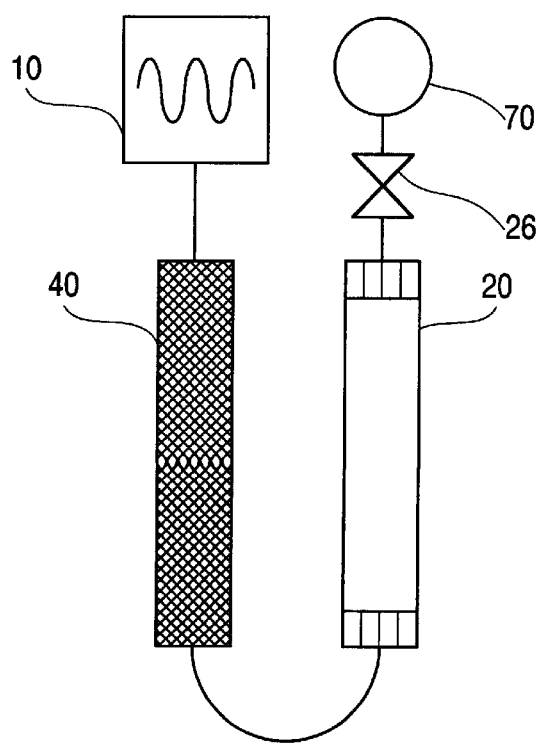
FIG. 3 shows a schematic view of a pulse tube cooler according to a second aspect.

FIG. 3 shows a schematic view of a pulse tube cooler 20 according to the second aspect. In this case there is a substantial increase of the effectiveness by connecting a ballast volume 70 via a flow resistance (needle valve) 26 to the hot heat exchanger 22. On the one hand, more gas flows through the hot heat exchanger 22, which can release compressional heat there. On the other hand, the gas does work in the pulse tube 26 when shifting gas into the ballast volume 70, thereby reaching a substantially higher cooling effect.

Figure 4:
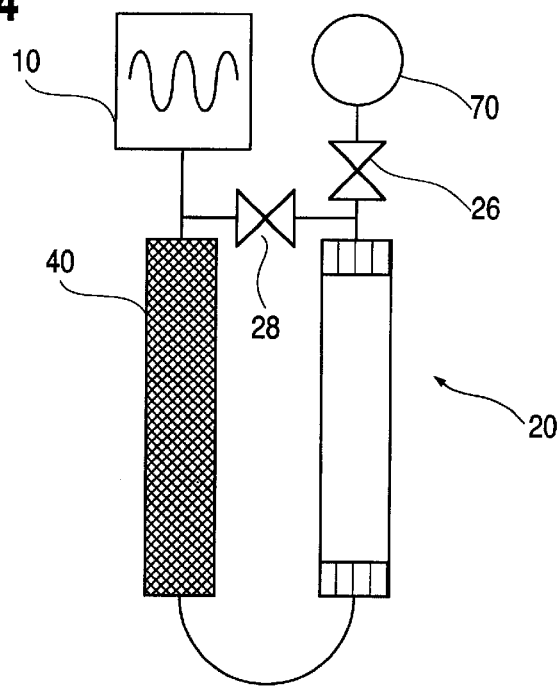
FIG. 4 shows a schematic view of a pulse tube cooler according to a third aspect.

FIG. 4 shows a schematic view of a pulse tube cooler according to a third aspect, with which the effectiveness of the cooler can be further increased, by conducting the portion of the gas flow which is required for the pressure change in the warm part of the pulse tube 20, through a second inlet at the hot end. As this gas flow does not pass the regenerator 40, the losses in the regenerator 40 are reduced. Moreover, with a second inlet (with valve 28), a more favorable time sequence of the pressure variations and flow variations for the cooling is achieved.

FIG. 5 shows a schematic overall structure of a pulse tube cooler according to the third aspect in a more detailed illustration than in FIG. 4. In this system, a commercial helium compressor 10 feeds a motor-operated rotation valve 15, which serves to control the helium gas flow.

For the mechanical decoupling and for reducing electro-magnetical disturbances the actual cooler and the rotation valve can be connected via a flexible plastic line 12.

Figure 6:
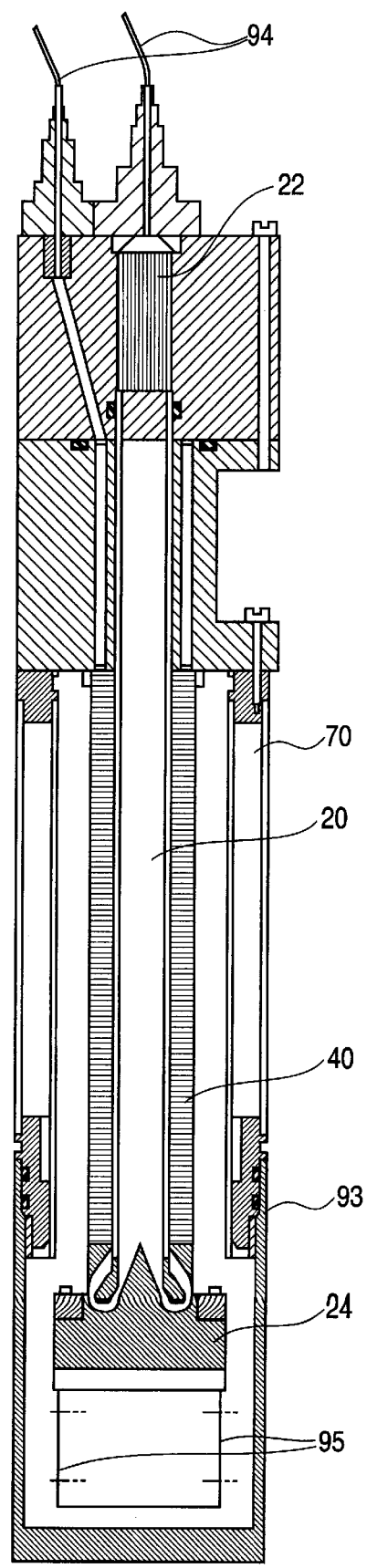
FIG. 6 shows a schematic cross-sectional view of a real geometry of a pulse tube cooler.

A real geometry of the pulse tube cooler is shown in a schematic cross-sectional view in FIG. 6. In order to obtain a construction form which is as slim (or space-saving) as possible, the pulse tube 20 and the regenerator 40 are arranged in a coaxial way. The hot heat exchanger 22 is only cooled by the surrounding air. The cold head 24 with the conically formed inner surface for guiding the gas flow serves as (cold) heat exchanger 24 between the object carrier for the objects 95 to be cooled and the working gas. The vacuum insulating tank 93 with integrated ballast volume 70, in the lower portion which encloses the objects 95 to be cooled, is made of plexiglass, whereby a reduction of electronic noise is reached. At the upper end of the pulse tube cooler gas inlets 94 are provided for the hot heat exchanger or the pulse tube.

Apart from using a single pulse tube cooler it is also possible to use a two-stage pulse tube cooler system in order to generate particularly low temperatures, as was already shown in FIG. 1.

FIG. 7 shows a schematic view of a two-stage pulse tube cooler system with the most important components. For generating pressure oscillations a compressor 10 is coupled to a rotation valve 15. A line 12 connects the rotation valve 15 with the pulse tube cooler system. This system has a regenerator 40 of a first stage and a regenerator 50 of a second stage, a flow straightener 45 being arranged between these two regenerators. The pulse tube cooler system further comprises a first pulse tube 20 with a hot heat exchanger 22 and a cold heat exchanger or a cold head 24, and a second pulse tube 30 with a hot heat exchanger 32 and a cold heat exchanger or a cold head 34. The respective hot heat exchangers 22 and 32 are connected via throttle valves, for example in the shape of needle valves 26 and 36, with a common ballast tank or ballast volume 70. Furthermore, it could be considered that instead of the common ballast volume two separated ballast volumes are used. Moreover, valves 28 and 38 are provided at the respective hot heat exchangers 22 and 32 for a second inlet. The cold head 24 of the first pulse tube 20 thereby pre-cools an area surrounded by a heat shield or a radiation shield 92 to an approximate maximum of 50 K, while at the cold head 34 of the second pulse tube 30 a temperature of approximately 2.2 to 4.2 K is provided (compare C. Wang et al: "A two-stage pulse tube cooler operating below 4 K", Cryogenics 1997, Volume 37, No. 3).

The cooling systems of the detector device according to the present invention which comprise pulse tube coolers have little vibration on account of their lacking movable parts and therefore are particularly suited for cooling sensible sensors such as SQUIDs.

Detector device

As a detector means in a detector device according to the present invention a microcalorimeter can be used for example, the sensor of which is a phase transition thermometer. In general, a microcalorimeter includes a sensor means consisting of a thermometer which comprises a superconducting material having a transition temperature range of the normally conducting to the superconducting phase with a finite width, the transition temperature being in the center of the transition temperature range, and the electrical resistance of the superconducting material within the transition temperature range increasing with increasing temperature. The microcalorimeter further comprises an absorber which is thermally coupled to the thermometer and interacts with the incident particles or radiation. A cooling means is provided for supplying an operational temperature below the transition temperature of the thermometer, the temperature operating point of the thermometer being adjustable within the transition temperature range by heating means. In order to register a change of resistance due to the incident particles or radiation a read-out electronics is provided which is electrically or magnetically connected with the thermometer and which detects the current flowing through the thermometer. To minimize the cooling performance to be provided the cooling means and the heating means are preferably thermally connected with the sensor means separately from each other. To improve the signal acceleration the cooling means or the heating means or both at the same time can be extensively (via an area) thermally connected with the sensor means. By an extensive thermal coupling it is to be understood that the coupling is effected via an extended contact area and not only in a quasi-point form as in the case of bonding wires.

The FIG. 8 show a schematic view of a real geometry of the components of a microcalorimeter which can be used as detector means in the case of the detector device according to the present invention.

Figure 8A:
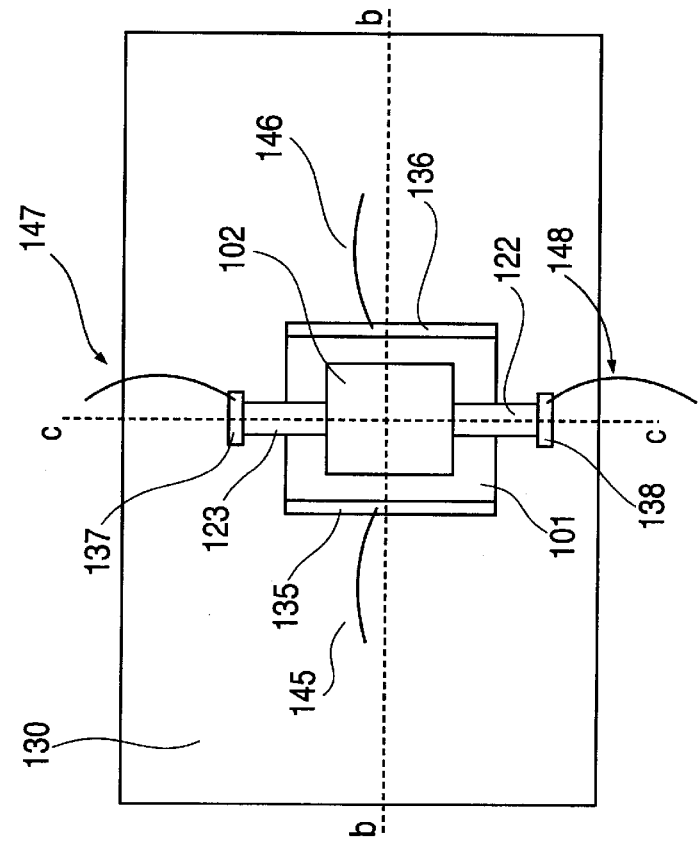
FIG. 8 shows a schematic view of a real geometry of a microcalorimeter used as a detector device.
Figure 8B:
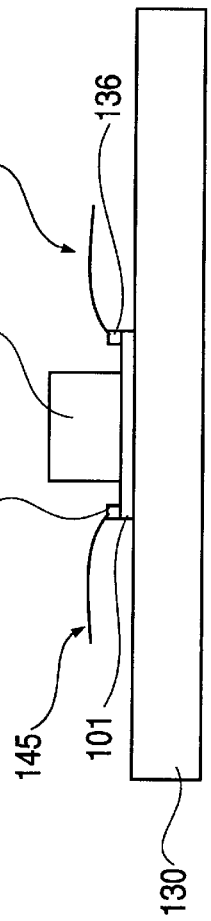
Figure 8C:
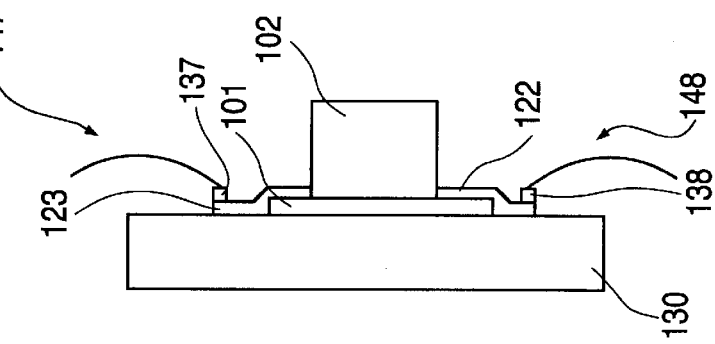

FIG. 8a shows a top view on the arrangement of the microcalorimeter, FIG. 8b shows a sectional view along the line b—b presented in FIG. 8a, and FIG. 8c shows a sectional view along the line c—c presented in FIG. 8a. Seen from the top to the bottom a thermometer (superconducting film) 101 is electrically contacted via aluminum contact surfaces, so-called aluminum bond pads 135, 136, and is read out via superconducting wires 145, 146 by way of a read-out electronics, for example, a conventional pre-amplifier electronics, however, preferably by way of a SQUID-system. As heating elements gold heaters 122, 123 are connected via an electrical conducting absorber 102. They are electrically contacted via aluminum bond pads 137, 138, and are connected via superconducting wires 147, 148 to a voltage source (not shown). The gold heaters are coupled via their thermal conductivity to the thermometer 101 and the absorber. A substrate 130 thereby offers a coupling to the cooling means.

What is disclosed is a detector device with a cooling system having first cooling means for providing a first cooling temperature, said first cooling means comprising a two-stage pulse tube cooler system, in which a first pulse tube cooler pre-cools a second pulse tube cooler, and second cooling means for providing a second cooling temperature, which is lower than the first cooling temperature, said second cooling means being pre-cooled by said first cooling means. Furthermore, the detector device comprises detector means for detecting particles, radiation or fields with a sensor based on a low temperature effect, said detector means being thermally coupled to said second cooling means. Thus, a detector device is provided with a comparably simply structured cooling system whereby sensors can be operated which have a good energy resolution and which can be anywhere on account of the low complexity of the cooling system.

List of reference signs

| | |
|---|---|
| 10 | Compressor |
| 12 | Outgoing line from the compressor |
| 15 | Rotation valve |
| 20 | Pulse tube, first pulse tube |
| 22 | Hot heat exchanger from 20 |
| 24 | Cold heat exchanger, cold head from 20 |
| 26 | Flow resistance, needle valve to 70 |
| 28 | Valve of the second inlet |
| 30 | Second pulse tube |
| 32 | Hot heat exchanger from 30 |
| 34 | Cold heat exchanger, cold head from 30 |
| 36 | Flow resistance, needle valve to 70 |
| 38 | Valve of the second inlet |
| 40 | Regenerator, regenerator of the first stage |
| 50 | Regenerator of the second stage |
| 60 | Detector means |
| 70 | Ballast volume |
| 80 | Vacuum tank |
| 81 | 67K-shield |
| 82 | Magnet of the second demagnetizing stage |
| 83 | Salt pill of the second demagnetizing stage |
| 84 | 4K-shield |
| 85 | Kevlar suspension |
| 86 | Clamping device |
| 87 | Thermal switch |
| 90 | Inlet window |
| 91 | Cryostat |
| 92 | Heat shield, radiation shield |
| 93 | Vacuum isolating device |
| 94 | Magnetic shield |
| 95 | Cooling finger |
| 101 | Thermometer (superconducting film) |
| 102 | Absorber |
| 122, 123 | Gold heater |
| 130 | Substrate |
| 135, 136 | Aluminum bond pads at the thermometer |
| 137, 138 | Aluminum bond pads at the |

-continued

List of reference signs

| | |
|---|---|
| 145, 146 | Superconducting read-out wires at the thermometer |
| 147, 148 | Superconducting wires at the gold heater |

What is claimed is:

1. A detector device comprising:
   a cooling system having
      first cooling means (20, 30) for providing a first cooling temperature ($T_K$), said first cooling means comprising a two-stage pulse tube cooler system, in which a first pulse tube cooler (20) pre-cools a second pulse tube cooler (30), and 736
      second cooling means (82, 83, 85, 86, 87) for providing a second cooling temperature ($T_T$), which is lower than the first cooling temperature ($T_K$), said second cooling means being pre-cooled by said first cooling means; and
   detector means (60) for detecting particles, radiation or fields with a sensor (101) based on a low temperature effect, said detector means being thermally coupled to said second cooling means.

2. The detector device in accordance with claim 1, characterized in that said first cooling means comprises three or more pulse tube coolers.

3. The detector device in accordance with claim 2, characterized in that said pulse tube coolers of said first cooling means are arranged such that they reach the first cooling temperature ($T_K$) in several successive cooling stages.

4. The detector device in accordance with claim 1, characterized in that each of the pulse tube coolers (20,30) comprises:
   a pulse tube (20, 30) at one end of which a cold heat exchanger (24, 34) is provided at which heat is absorbed from outside, and at the other end of which a hot heat exchanger (22, 32) is provided at which heat is released to the outside;
   a regenerator (40, 50) which serves as an interim heat reservoir; and
   a pressure oscillator (10, 15) which serves to generate periodic pressure changes,
   said pulse tube (20, 30) at the end of which said cold heat exchanger is provided, being connected by way of respective lines (12) with said pressure oscillator (10, 15) via said regenerator (40, 50), so that a periodic shift of a working gas between said pulse tube and said pressure oscillator is made possible.

5. The detector device in accordance with claim 4, characterized in that said pulse tube (20,30) at the end where said hot heat exchanger (22, 32) is provided, further comprises a flow resistance (26, 36) and a container (70) for receiving a ballast volume.

6. The detector device in accordance with claim 5, characterized in that each of the pulse tube coolers (20,30) further comprises a secondary line extending from the respective end of said pulse tube (20,30), at which said hot heat exchanger is provided, to said line (12) between said pressure oscillator and said regenerator and runs into there, said secondary line comprising a variable flow resistance (28, 38).

7. The detector device in accordance with claim 4, characterized in that said second cooling means (82, 83, 85, 86, 87) is positioned at or in the vicinity of said cold heat exchanger (24, 34) of a pulse tube (20,30).

8. The detector device in accordance with claim 1, characterized in that said detector means (60) further comprises an absorber (102) which is thermally coupled to said sensor (101), and in which incident particles and/or radiation interact.

9. The detector device in accordance with claim 8, characterized in that said absorber (102) consists of a dielectric or a semiconductor or a metal or a semi-metal or a semimetal alloy or a superconductor or a combination of the individual materials.

10. The detector device in accordance with claim 1, further characterized by heating means (122, 123) thermally coupled to said detector means.

11. The detector device in accordance with claim 1, characterized in that said sensor comprises a transition edge thermometer (101).

12. The detector device in accordance with claim 1, characterized in that said sensor comprises a superconducting tunnel diode, such as an SIS-diode or a NIS-diode.

13. The detector device in accordance with claim 1, characterized in that said sensor comprises a thermistor, such as a NTD-thermistor.

14. The detector device in accordance with claim 1, characterized in that said sensor comprises a magnetic bolometer.

15. The detector device in accordance with claim 1, characterized in that said detector means (60) comprises a plurality of sensors.

16. The detector device in accordance with claim 1, characterized in that said detector means (60) comprises a plurality of sensors.

17. The detector device in accordance with claim 1, characterized in that said second cooling means comprises a demagnetizing stage (82, 83, 85, 86, 87) or a $^3$He/$^4$He-dilution refrigerator or a $^3$He-cooler or mechanic cooling means such as a helium compressor cooler or electric cooling means such as a Peltier element or a superconducting tunnel diode such as an NIS-diode.

18. The detector device in accordance with claim 1, characterized in that said cooling system is part of a cryostat (91) in which said detector means (60) is incorporated, said cryostat (91) further comprising an inlet port (90) for passing the particles and the radiation to be examined from the outer part of the cryostat into the inner part of the cryostat to said detector means (60).

19. The detector device according to claim 18, characterized in that said cryostat comprises focussing means such as an X-ray lens or a Wolter arrangement or a Fresnel lens or a focussing tube bundle or electric focussing means/defocussing means or magnetic focussing means/defocusing means.

20. A detector device comprising:
a cooling system having
first cooling means (20, 30) for providing a first cooling temperature ($T_K$), said first cooling means comprising a two-stage pulse tube cooler system, in which a first pulse tube cooler (20) pre-cools a second pulse tube cooler (30), and
second cooling means (82, 83, 85, 86, 87) for providing a second cooling temperature ($T_T$), which is lower than the first cooling temperature ($T_K$), said second cooling means being pre-cooled by said first cooling means, wherein the second cooling means comprises a demagnetizing stage having a salt pill (83) surrounded by a magnet (82) and a thermal switch (87) for thermally coupling or de-coupling the salt pill and the magnet during operation of the demagnetizing stage; and
detector means (60) for detecting particles, radiation or fields with a sensor (101) based on a low temperature effect, said detector means being thermally coupled to said salt pill (83).

* * * * *